(12) United States Patent
Zimmer et al.

(10) Patent No.: US 12,128,555 B2
(45) Date of Patent: Oct. 29, 2024

(54) LAYER MODULE, ADAPTER SYSTEM AND LAYER MODULE SYSTEM

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

(*) Notice: Subject to any disclaimer, the term of this patent is extended or adjusted under 35 U.S.C. 154(b) by 119 days.

(21) Appl. No.: 18/024,056

(22) PCT Filed: Aug. 31, 2021

(86) PCT No.: PCT/DE2021/000143
§ 371 (c)(1),
(2) Date: Mar. 1, 2023

(87) PCT Pub. No.: WO2022/048700
PCT Pub. Date: Mar. 10, 2022

(65) Prior Publication Data
US 2023/0311299 A1 Oct. 5, 2023

(30) Foreign Application Priority Data
Sep. 2, 2020 (DE) ...................... 10 2020 005 381.5

(51) Int. Cl.
*B25J 9/00* (2006.01)
(52) U.S. Cl.
CPC .................... *B25J 9/0009* (2013.01)
(58) Field of Classification Search
CPC ...... B25J 9/0009; B25J 15/04; B25J 15/0425; B25J 15/0458; B25J 19/0029; B25J 19/0033

USPC ......................................... 439/296, 304, 378
See application file for complete search history.

(56) References Cited

U.S. PATENT DOCUMENTS

| | | | |
|---|---|---|---|
| 4,826,230 A * | 5/1989 | Truchet ................ | B23Q 1/0063 294/90 |
| 5,192,844 A | 3/1993 | Todd et al. | |
| 6,484,612 B1 | 11/2002 | Miyachi et al. | |
| (Continued) | | | |

FOREIGN PATENT DOCUMENTS

| CN | 109262593 A * | 1/2019 | .............. B25J 19/00 |
|---|---|---|---|
| DE | 10050619 B4 | 3/2006 | |
| (Continued) | | | |

*Primary Examiner* — Bobby Rushing, Jr.
(74) *Attorney, Agent, or Firm* — Smartpat PLC

(57) ABSTRACT

A layer module for use on a robot has an inlet side having an inlet-side mechanical adapter geometry and an outlet side having an outlet-side mechanical adapter geometry. The inlet-side and the outlet-side mechanical adapter geometries are complementary to one another. The layer module has at least one functional assembly. The functional assembly can be contacted electrically, hydraulically and/or pneumatically on the inlet side and/or on the outlet side. An adapter system comprises at least two such layer modules. A layer module system comprises an adapter system and a fixed part, the fixed part being connected to the free inlet side or to the free outlet side of the adapter system. The layer module has at least two locking parts that are mounted in a spring-loaded, displaceable or pivotable manner, and at least two guide elements oriented in the longitudinal direction of the layer module that have geometrically different designs.

10 Claims, 10 Drawing Sheets

(56) References Cited

U.S. PATENT DOCUMENTS

| | | | | |
|---|---|---|---|---|
| 7,794,171 | B2 * | 9/2010 | Park | B25J 3/04 |
| | | | | 403/349 |
| 8,209,840 | B2 * | 7/2012 | Norton | B23B 31/1071 |
| | | | | 403/322.2 |
| 10,286,566 | B2 * | 5/2019 | Williams | B25J 19/0033 |
| 2009/0314113 | A1 * | 12/2009 | Wang | B25J 15/04 |
| | | | | 74/148 |
| 2010/0067981 | A1 | 3/2010 | Geyer | |
| 2019/0358830 | A1 * | 11/2019 | Nishio | B25J 15/0425 |
| 2021/0197363 | A1 | 7/2021 | Zimmer et al. | |

FOREIGN PATENT DOCUMENTS

| | | | | |
|---|---|---|---|---|
| DE | 102006040034 | A1 | 3/2008 | |
| DE | 102011003278 | A1 * | 8/2012 | B25J 15/04 |
| DE | 102013015256 | A1 | 3/2015 | |
| DE | 112009002127 | B4 * | 2/2019 | B23B 31/103 |
| DE | 102017009319 | | 4/2019 | |
| DE | 102017127875 | A1 | 5/2019 | |
| EP | 3694688 | A1 | 8/2020 | |
| JP | S60213493 | A | 10/1985 | |
| WO | WO-2013117535 | A1 * | 8/2013 | B25J 15/04 |

\* cited by examiner

LAYER MODULE, ADAPTER SYSTEM AND LAYER MODULE SYSTEM

CROSS-REFERENCE TO RELATED APPLICATION

This application is a national stage application, filed under 35 U.S.C. § 371, of International Patent Application No. PCT/DE2021/000143, filed on 31 Aug. 2021, which claims the benefit of German Patent Application No. 10 2020 005 381.5, filed 2 Sep. 2020.

BACKGROUND

The disclosure relates to a layer module for use on a robot, with an inlet side having an inlet-side mechanical adapter geometry and with an outlet side having an outlet-side mechanical adapter geometry.

Layer modules and an adapter system with a plurality of layer modules are known from DE 10 2017 009 319 B3.

SUMMARY

The disclosure relates to a layer module for use on a robot, with an inlet side having an inlet-side mechanical adapter geometry and with an outlet side having an outlet-side mechanical adapter geometry, wherein the inlet-side mechanical adapter geometry and the outlet-side mechanical adapter geometry are designed to be complementary to one another, wherein the layer module has at least one electrical, electromechanical, hydraulic and/or pneumatic functional assembly and wherein such functional assembly can be contacted electrically, hydraulically and/or pneumatically on the inlet side and/or on the outlet side, an adapter system comprising at least two such layer modules along with a layer module system comprising an adapter system and a fixed part, wherein the fixed part is connected to the free inlet side or to the free outlet side of the adapter system in a force-locking and/or positive-locking manner.

The present disclosure is based on the problem of developing a rapidly exchangeable layer module, an adapter system with such layer modules and a layer module system with an adapter system.

This problem is solved with the features of the main claim. For this purpose, the layer module has at least two locking parts that are mounted in a spring-loaded, displaceable or pivotable manner, and at least two guide elements that are oriented in the longitudinal direction of the layer module and have geometrically different designs. Each of the locking parts engages around a respective guide element, such that the layer module can be coupled with a fixed part having a fixed part outlet complementary to the inlet side or to the outlet side and/or with at least one further layer module in a force-locking and/or positive-locking manner.

In the adapter system consisting of at least two such layer modules, the outlet side of a first of such layer modules is connected to the inlet side of a second of such layer modules in a force-locking and/or positive-locking manner.

In the layer module system, the outlet side of the fixed part is complementary to the inlet side or to outlet side of the adapter system coupled to it.

When assembling the layer modules, the position of the individual layer modules relative to one another is determined by means of the guide elements. After joining, the respective spring-loaded locking elements secure the position of the layer modules relative to one another in a force-locking and/or positive-locking manner.

Further details of the invention will be apparent from the subclaims and the following description of schematically illustrated embodiments.

DETAILED DESCRIPTION

FIGS. 1-8 show a layer module (30) and some of its individual parts. Such layer modules (30) are used on industrial robots, for example. They are located, for example, on an arm of the robot between a joint and, for example, at least one tool, for example, at least one handling tool, processing tool, measuring tool, camera, etc. Handling tools are, for example, gripping tools, pushing tools, pulling tools, etc. They can be electrically, pneumatically or hydraulically actuated. Machining tools are, for example, cutting or non-cutting machining tools, for example milling cutters, drills, saws, bending punches, etc. The layer module (30) can also be arranged on the arm of the robot without a downstream tool, for example when the layer module is designed as a camera module (31).

Thereby, an individual layer module (30) can be arranged on one arm. It is also conceivable to connect a plurality of such layer modules (30) to one another on one arm. The individual layer modules (30) connected in series may have different designs. The individual layer module (30) has a functional assembly (41). For example, the individual functional assembly (41) has an electrical, optical, pneumatic and/or hydraulic input variable and converts it to an electrical, electromechanical, pneumatic and/or hydraulic output variable. Each layer module (30) can have a different functional assembly (41). For example, the handling device then follows the last of such layer modules (30).

Figure 1:
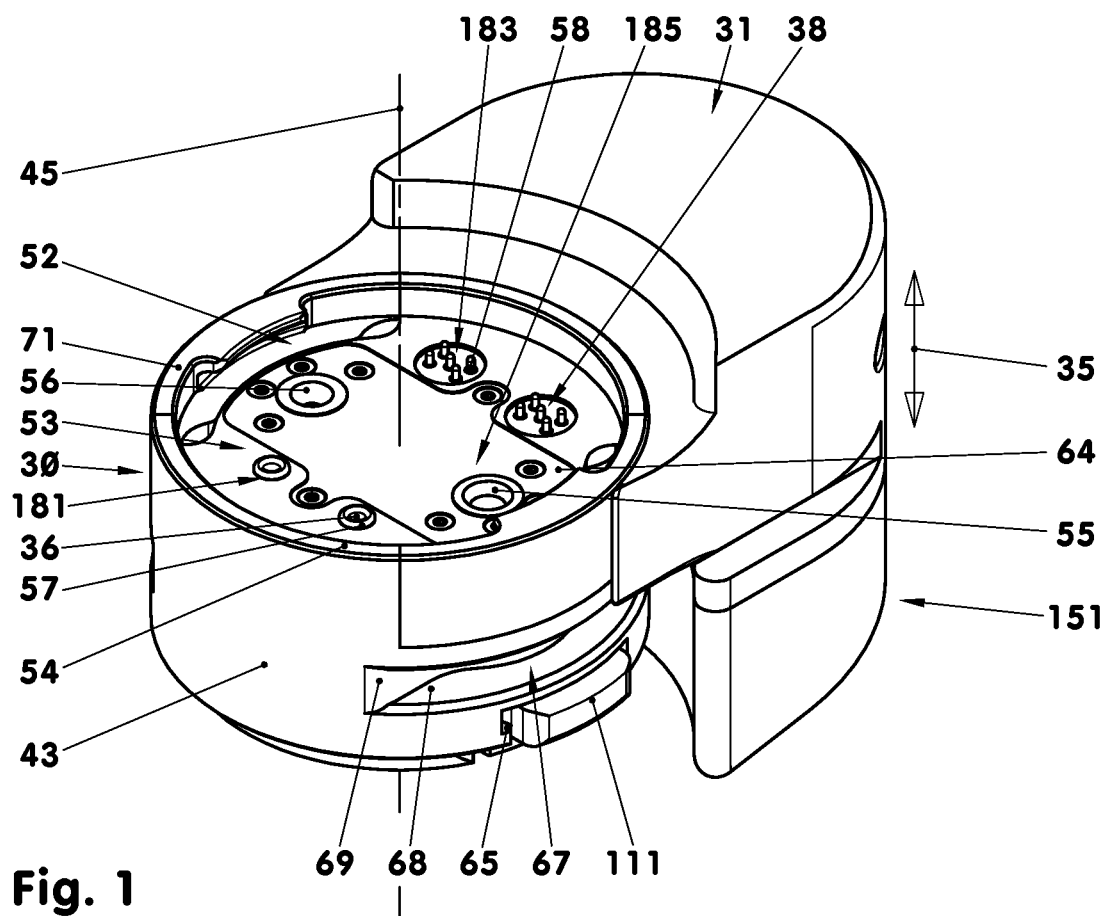
FIG. 1: Camera module as a layer module.
Figure 2:
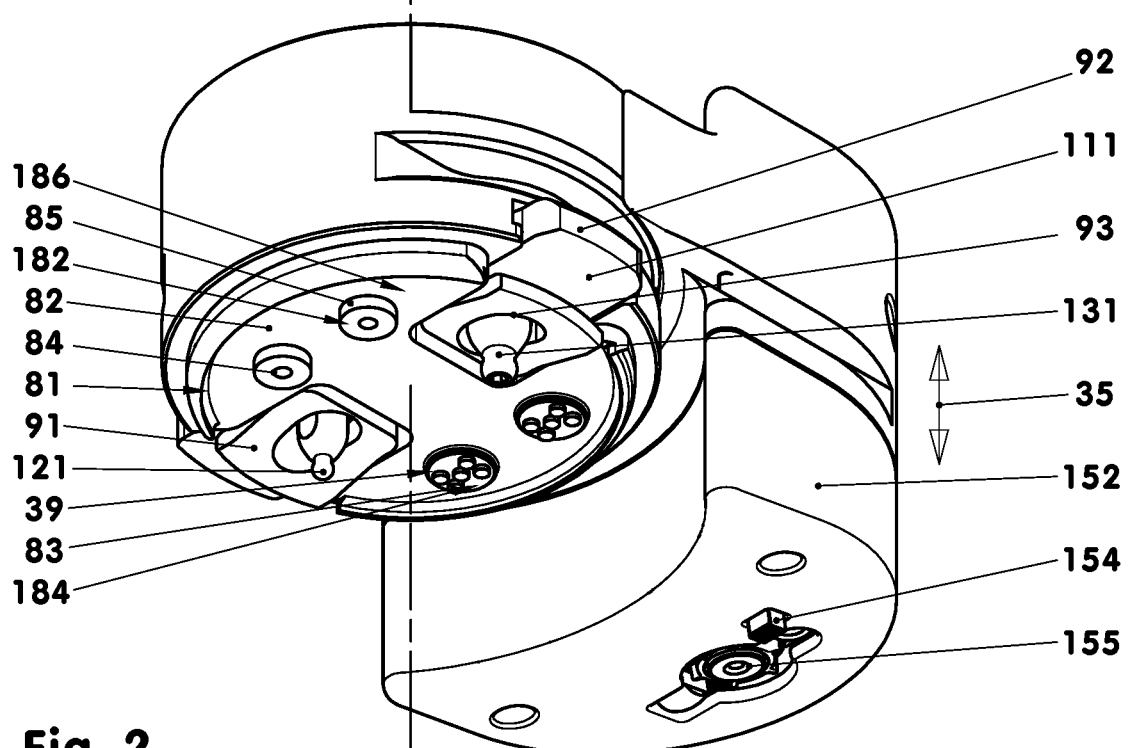
FIG. 2: Bottom view of FIG. 1.

In the exemplary embodiment, the individual layer module (30) is designed in the shape of a disk. It has a housing (51) that is bounded in its longitudinal direction (35) by an inlet side (52) and by an outlet side (81). In the illustrations of FIGS. 1 and 2, the inlet side (52) is at the top and the outlet side (81) is at the bottom. For example, the inlet side

(52) faces the arm of the robot and the outlet side (81) faces the gripping tool. The layer module (30) can also be designed such that the side referred to here as the outlet side (81) is oriented toward the arm of the robot. The side designated as the inlet side (52) then faces the handling device, for example.

In the exemplary embodiment shown, the layer module (30) carries a camera system (151), which is oriented in the direction of the outlet side (81). The camera system (151) is part of the functional assembly (41) of the layer module (30).

The inlet side (52) is shell-shaped. It has a cover region (53) and an edge (54) protruding beyond it. In this exemplary embodiment, two guide element receptacles (55, 56) of different sizes are arranged in the cover region (53) of the base body (61). In the illustration of FIG. 1, the right guide element receptacle (55) has a larger cross-section than the left guide element receptacle (56).

On the side of the cover region (53) turned away from the camera system (151), the layer module (30) has two pneumatic channels (36). Each of these has an annular seal insert (57) at its channel inlet (86) on the inlet side. In the exemplary embodiment, the two channel inlets (86) form a part of a pneumatic input interface (181) on the layer module side.

Two groups (38) of electrical inlet contacts (58) are arranged between the guide element receptacles (55, 56) and the camera system (151). These form an electrical interface bank (183) on the inlet side. In the exemplary embodiment, each of the groups (38) has five inlet contacts (58). The individual inlet contact (58) is designed as a spring-loaded contact pin (59) and protrudes above the plane of the cover region (53).

The edge (54) is designed to be annular and completely surrounds the cover region (53). It has a planar upper side (62) oriented, for example, normal to the longitudinal direction (35) of the layer module (30). In the exemplary embodiment, the edge (54) has two insert pieces (71). Such insert pieces (71) are arranged opposite one another, for example. In the upper region of the illustration of FIG. 1, they have an inwardly directed circumferential edge (72). The interior space (42) of the layer module (30) is covered by means of a lid (64). In this exemplary embodiment, the circumferential edges 0 and the guide element receptacles (55, 56) define the inlet-side mechanical adapter geometry (185) of the layer module (30).

The housing (51) of the layer module (30) is formed, for example, by a base body (61) and the specified insert pieces (71). In the exemplary embodiment, the base body (61) is made of aluminum. For example, the modulus of elasticity of such material amounts to 70000 newtons per square millimeter.

Figure 3:
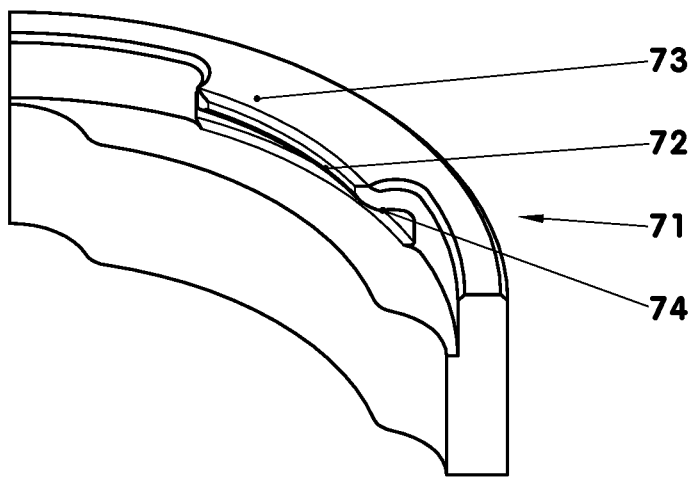
FIG. 3: Insert piece.

FIG. 3 shows an insert piece (71). In the exemplary embodiment, the two insert pieces (71) are designed to be identical to one another. They have the shape of shell section. The circumferential edge (72) covers a sector of, for example, 67 degrees. Each circumferential edge (72) is designed to be wedge-shaped in cross-section. Its upper side (73) and its lower side (74) enclose an angle of 5 degrees in the exemplary embodiment. The apex line of such angle is oriented in the direction of the longitudinal axis (45). The upper side (73) lies in the plane of the planar surface (63) of the edge (54) when the insert pieces (71) are mounted. Outside and below the circumferential edge (72), the inside diameter of the insert pieces (71) corresponds to the inside diameter of the edge (54) of the base body (61). The outer diameter of the insert pieces (71) corresponds to the outer diameter of the base body (61).

In the exemplary embodiment, the insert pieces (71) are made of steel. The modulus of elasticity of such material amounts to 210,000 newtons per square millimeter. Thus, such modulus of elasticity amounts to three times the modulus of elasticity of the base body (61). The materials may be selected so that the modulus of elasticity of the insert pieces (71) amounts to more than twice the modulus of elasticity of the base body (61). It is also conceivable to use the insert pieces (71) as replacement parts. For this purpose, they may be made of a plastic, for example.

The outlet side (81) of the layer module (30) is shown in FIG. 2. It has a base plate (82) from which two guide elements (121, 131) project. Furthermore, two groups (39) of contact plates (83) are arranged on the base plate (82). In this exemplary embodiment, these form the electrical interface bank (184) on the outlet side. In this exemplary embodiment, the outlet side (81) also has two pneumatic connections (84). In the exemplary embodiment, such pneumatic connections (84) form a part on the layer module side of a pneumatic outlet interface (182).

The two guide elements (121, 131) are designed to be geometrically different. The guide element (121) shown on the left in the illustration of FIG. 2, hereinafter referred to as the first guide element (121), has a narrower guide element head (128) than the second guide element (131) shown on the right. In the exemplary embodiment, both guide elements (121, 131) are designed as guide pins (121, 131). The guide elements (121, 131) can also be designed as dowel or cones, etc.

Figure 4:
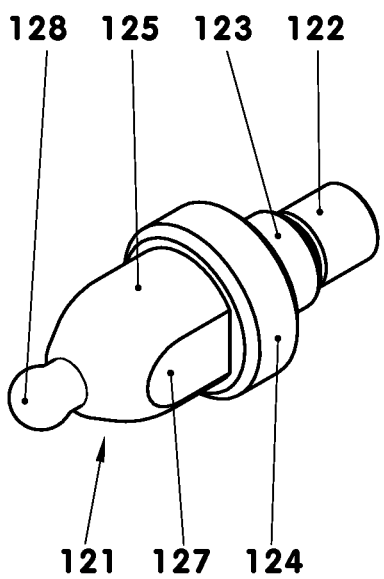
FIG. 4: First guide element.
Figure 5:
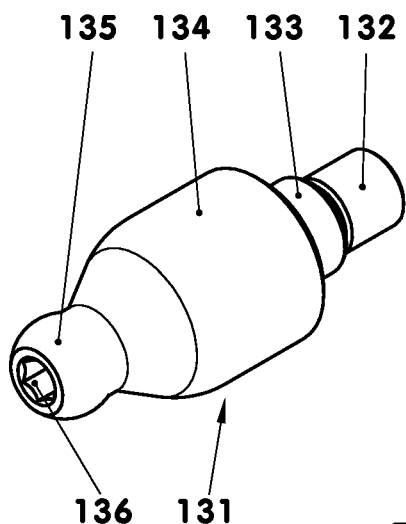
FIG. 5: Second guide element.

FIG. 4 shows the first guide pin (121) of the exemplary embodiment. FIG. 5 then shows the second guide pin (131) of such exemplary embodiment. The two guide pins (121, 131) have the same length, for example. In the exemplary embodiment, they are made of the same material as the insert pieces (71).

The first guide pin (121) has an external thread (122) whose nominal dimension corresponds to the nominal dimension of a threaded bore of the base body (61). A guide collar (123), the diameter of which is larger than the nominal dimension of the threaded bore, adjoins the external thread (122). A support collar (124) is adjacent to the guide collar (123).

A mounting section (125) is adjacent to the support collar (124) of the first guide pin (121). In the exemplary embodiment, this has two mutually parallel key surfaces (127) arranged on its shell surface. The guide pin head (128) adjoins the mounting section (125). In the exemplary embodiment, this is designed in a dome shape.

The second guide pin (131) also has an external thread (132) and a guide collar (133). These are designed like the corresponding regions of the first guide pin (121). The support collar (134) of the second guide pin (131) is designed, for example, as long as the sum of the lengths of the support collar (124) and the mounting section (125) of the first guide pin (121). The guide pin head (135) of the second guide pin (131) is also designed to be dome-shaped. The second guide pin (131) has an internal hexagon (136) on its end face.

A locking part (91; 111) is displaceably mounted on each of the two guide elements (121; 131). The individual locking part (91; 111) has an outwardly facing gripping region (92). The two locking parts (91, 111) are arranged opposite one another on the layer module (30). In the exemplary embodiment, they lie in a common plane normal to the longitudinal axis (45) of the layer module (30). An offset angle other than 180 degrees of the two locking parts (91, 111) relative to one another is also conceivable. For example, they may be offset relative to one another in a range from 90 degrees to the angle mentioned above. The gripping regions (92) may be designed to be flat or curved outwards or curved inwards. In the exemplary embodiment, the locking parts (91, 111) and the guide elements (121, 131) determine the outlet-side mechanical adapter geometry (186) of the layer module (30).

It is also conceivable to arrange one of the guide elements (121; 131) and the associated locking part (91; 111) on the inlet side (52) and the other guide element (131; 121) and the locking part (111; 91) allocated to it on the outlet side (81). An embodiment with more than two guide elements (121, 131) is also conceivable. Moreover, both locking parts (91; 111) can be operated by means of a gripping region (92).

Figure 6:
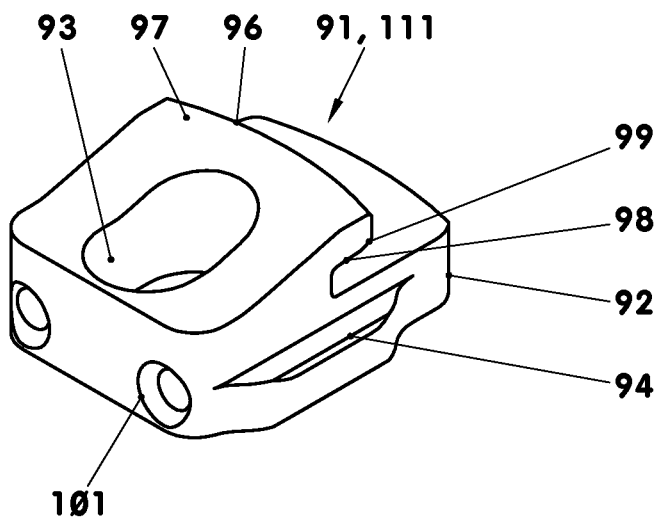
FIG. 6: Locking part.

FIG. 6 shows a locking part (91; 111). In the exemplary embodiment, both locking parts (91; 111) are designed to be identical to one another. However, it is also conceivable to form the two locking parts (91, 111) with different widths, for example. The individual locking part (91; 111) has a central guide slot (93) for receiving the guide collar (123; 133) of the respective guide element (121; 131). A support surface (106) of the guide slot (93) is used to support the support collar (124; 134) of the respective guide pin (121; 131), see FIG. 7. This prevents, among other things, lifting or tilting of the locking part (91; 111) relative to the housing body (61) when the layer module (30) is mounted. The guide slot (93) is oriented radially to the longitudinal axis (45) of the layer module (30).

The individual locking part (91; 111) further has two lateral guide strips (94). The guide strips (94) are parallel to the guide slot (93). When the layer module (30) is mounted, the guide strips (94) are guided in guide grooves (65) of the housing body (61).

On its outer side, the locking part (91; 111) has the gripping region (92). In the illustration of FIG. 6, a projecting hook (96) is arranged above the gripping region (92) and is spaced therefrom. The gripping region (92) protrudes beyond the hook (96) by 30% of the component length measured in the radial direction. The hook (96) is designed in an arc shape in a top view of the locking part (91; 111). The arc length amounts to 38 degrees in a normal plane to the longitudinal axis (45). In cross-section, see FIG. 7, the hook (96) is designed to be wedge-shaped. The wedge angle between the hook upper side (97) and the hook lower side (98) amounts to 5 degrees in the exemplary embodiment. This is also the size of the angle that the hook lower side (98) encloses with a normal plane to the longitudinal axis (45). At its free end, the hook (96) has an insertion chamfer (99) adjacent to the hook lower side (98) of the hook. The angle between the insertion chamfer (99) and the hook upper side (97) amounts to 30 degrees in the exemplary embodiment. On its rear side oriented towards the longitudinal axis (45), the individual locking part (91; 111) has two spring receptacles (101). When the layer module (30) is mounted, these are opposite similar spring receptacles of the base body (61). In the exemplary embodiment, the two locking parts (91, 111) are made of the same material as the insert pieces (71).

Above each locking part (91; 111), the layer module (30) has a gripping or guide recess (67). The individual gripping or guide recess (67) has, for example, a base surface (68) in the shape of a segment of a circle and a constant height. The guide surfaces (69) of both gripping or guide recesses (67) are oriented parallel to one another at least in certain regions. The individual gripping or guide recess (67) can also have a trapezoidal, round, elliptical, rectangular, etc. cross-section. In the exemplary embodiment, the maximum depth of the gripping or guide recess (67) corresponds to its height.

The camera system (151) of the camera module (31) has a camera housing (152), an optical unit (153) and an illumination unit (154). The camera housing (152) is molded or fastened to the cylindrical shell surface (43) of the layer module (30). In the exemplary embodiment, it overhangs the layer module (30) in both longitudinal directions (35).

Figure 7:
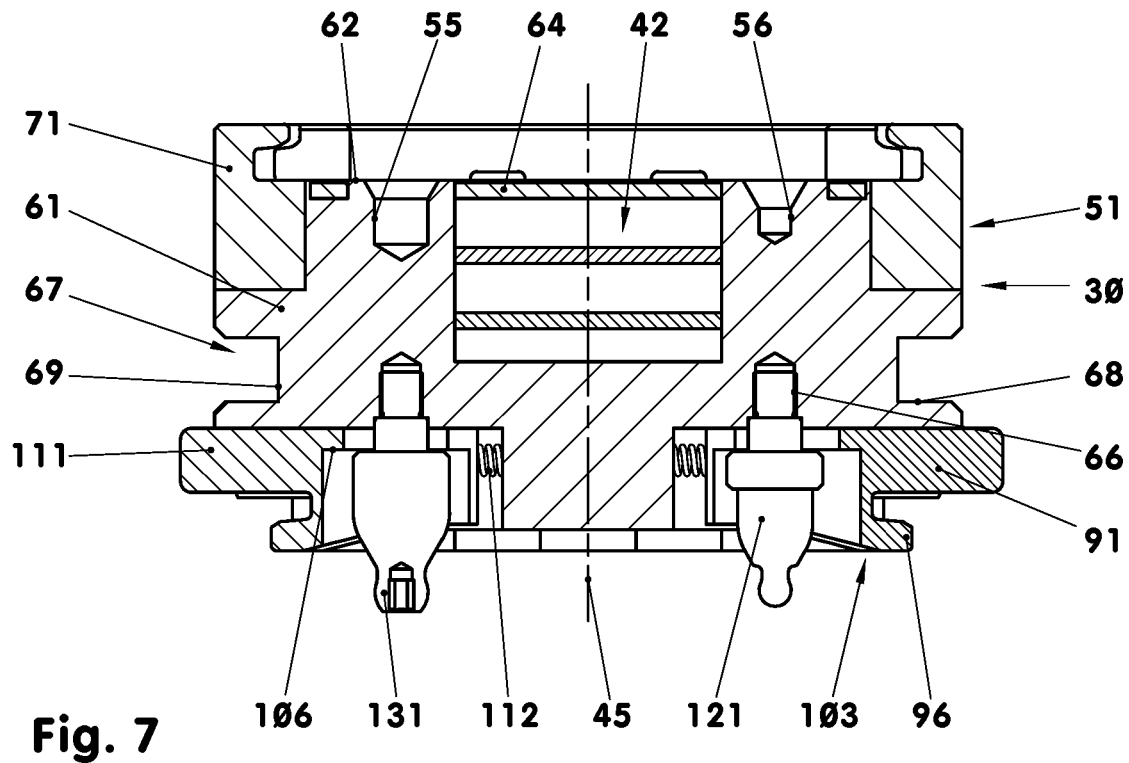
FIG. 7: Cross-section of the layer module from FIG. 1.

FIG. 7 shows a cross-section of the layer module (30). In this illustration, the inlet side (52) is at the top and the outlet side (81) is at the bottom. The insert pieces (71) are fastened in the base body (61), with their circumferential edges (72) facing one another. The lid (64) and camera housing (152) close the interior space (42) of the layer module (30), see FIG. 8. For example, a circuit board (141) is arranged in the interior space (42). This can be equipped with electrical components, for example data processing and storage units.

The center lines of the guide element receptacles (55, 56) are aligned with the center lines of the guide elements (121, 131). In the illustration of FIG. 7, the first guide element receptacle (56) is located above the first guide element (121). In such illustration, the second guide element receptacle (55) is arranged above the second guide element (131). Thereby, a first guide element receptacle (56) is designed to receive a first guide element (121) and a second guide element receptacle (55) is designed to receive a second guide element (131) of a further layer module (30).

The two guide pins (121, 131) are screwed into the base body (61). Each of the guide elements (121; 131) penetrates a respective locking element (91; 111) in the guide slot (93) and supports the latter displaceably. The rear gripping hooks (96) point outward. The individual locking element (91; 111) is supported on the base body (61) by two spring elements (112). The spring elements (112), for example designed as compression springs (112), are mounted in the spring receptacles (101) of the respective locking part (91; 111) and in the spring receptacles of the base body (61). The respective locking parts (91; 111) are loaded in a radially outward manner by means of the spring elements (112). The stroke of the individual locking part (91; 111) is limited by the respectively allocated guide element (121; 131).

Figure 8:
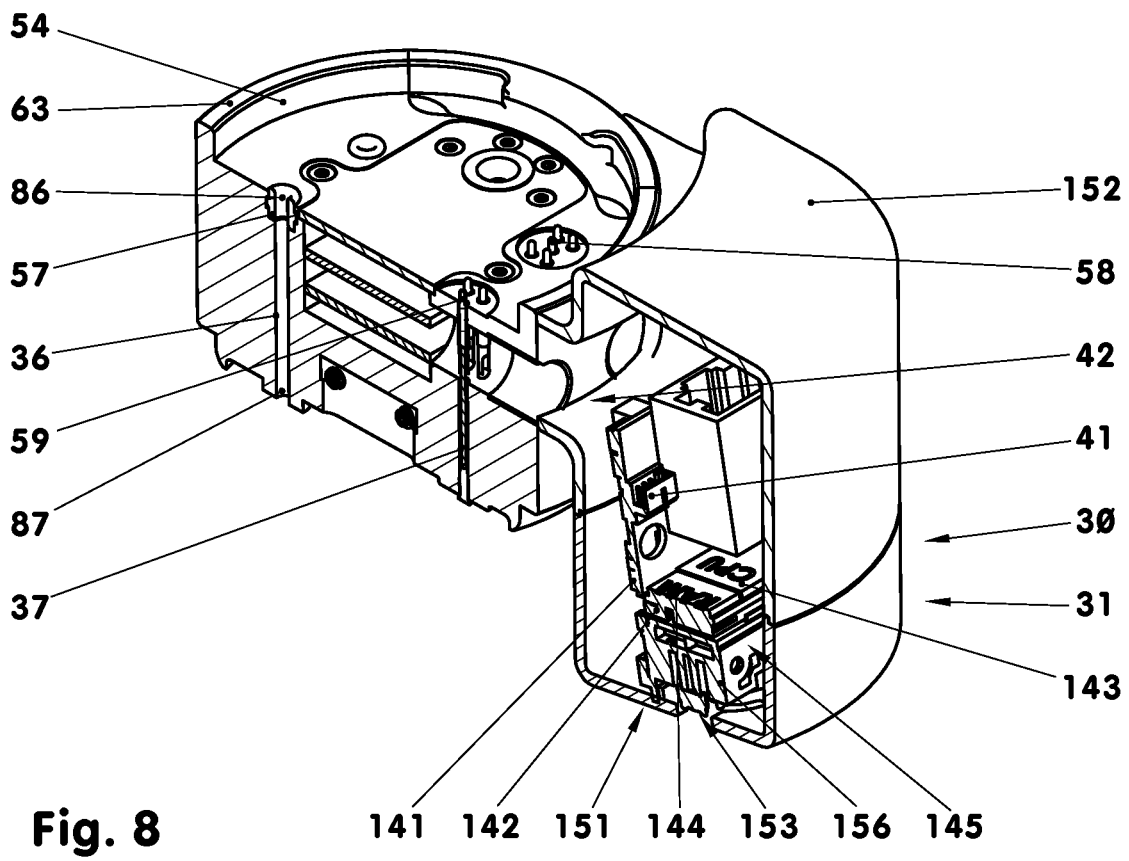
FIG. 8: Longitudinal section through FIG. 1 parallel to the vertical center longitudinal plane.
Figure 9:
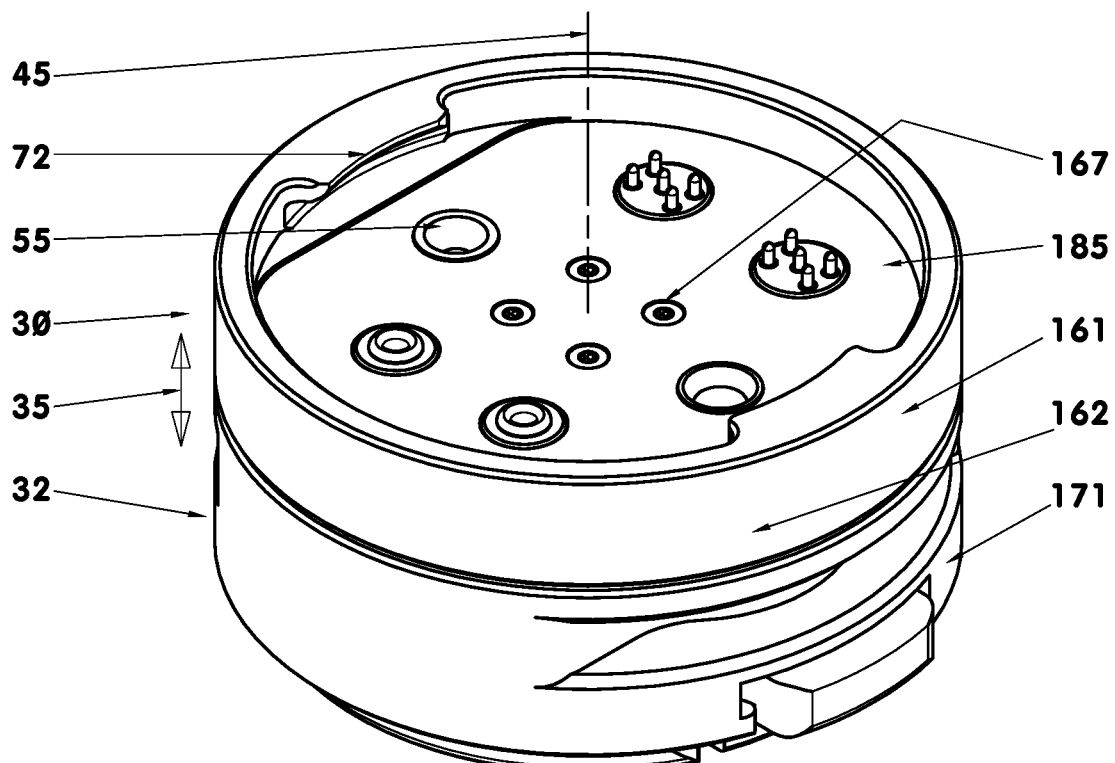
FIG. 9: Force measuring module as a layer module.
Figure 10:
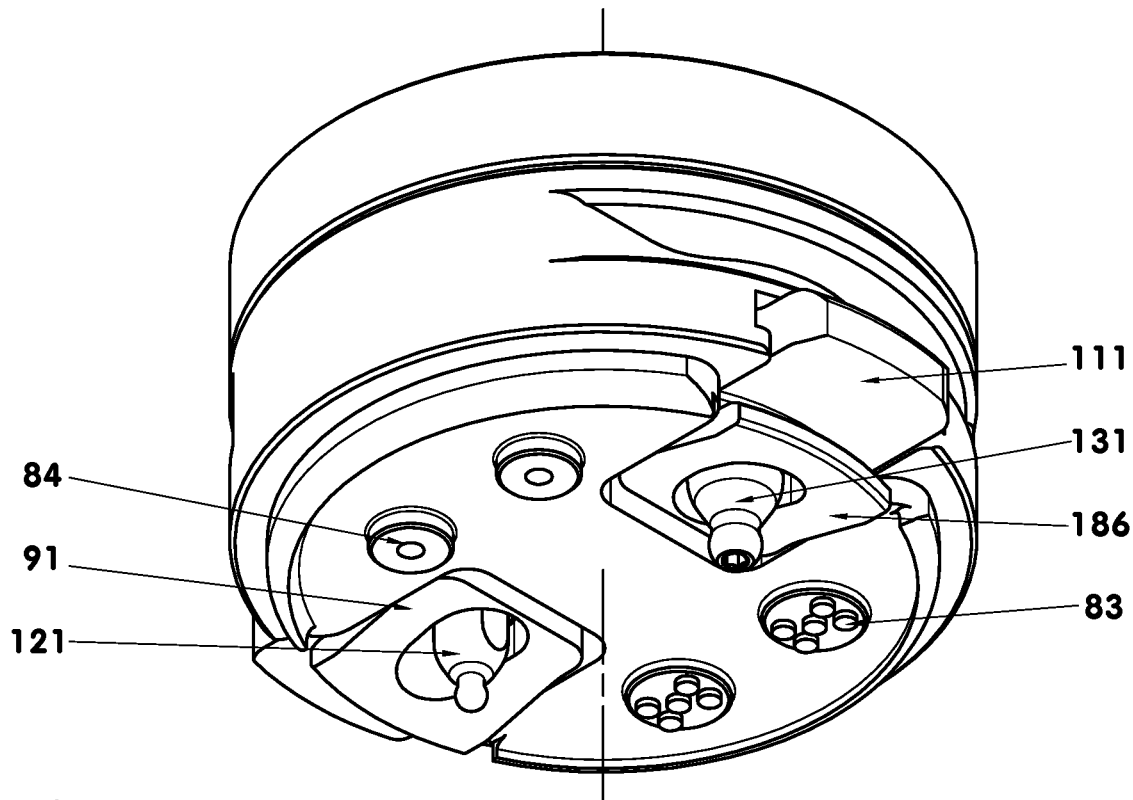
FIG. 10: Bottom view of FIG. 9.

FIG. 8 shows an isometric longitudinal section in a plane normal to the section plane of FIG. 7. Thereby, the section plane of FIG. 8 passes through the pneumatic channels (36) and the electrical lines (37). In this illustration as well, the inlet side (52) of the layer module (30) is at the top and the outlet side (81) is at the bottom.

The individual pneumatic channel (36) connects the inlet side (52) of the layer module (30) to the outlet side (81). It is arranged parallel to the longitudinal axis (45) of the layer module (30). The respective channel outlet (87) and the respective channel inlet (86) are vertically above one another in the illustration of FIG. 8. Thereby, for example, the seal insert (57) is arranged on the inlet side (52) and the support collar (85) is arranged on the outlet side (81). A reverse arrangement is also conceivable.

It is conceivable to use the two pneumatic channels (36) for different tasks. For example, one of the pneumatic channels (36) can deliver air or nitrogen from the inlet side (52) to the outlet side (81). The other pneumatic channel (36) then conveys a pneumatic medium, for example in the other direction. Thus, for example, a double-acting valve can be actuated in the handling device. Moreover, both pneumatic channels (36) can be used, for example, when using a suction gripper to generate a vacuum at the suction cup and to relieve the pressure.

Within the layer module (30), the individual pneumatic channel (36) can have a directional or blocking valve. This can, for example, prevent loss of pneumatic medium and prevent contamination of the pneumatic channels when the layer module (30) is used as an end module.

The individual pneumatic channel (36) can also have a branching. For example, the region of the electrical components can be supplied with sealing air to prevent the ingress of contaminants. Moreover, the region in front of the lens (155) and/or in front of the illumination unit (154) of the camera system (151) can be blown free with air to ensure consistent optical conditions. Moreover, for example, a shutter of the lens (155) can be pneumatically actuated.

Moreover, the individual electrical line (37) connects the inlet side (52) to the outlet side (81). In each case, one contact pin (59) is electrically connected to a contact plate (83). Thereby, the individual electrical line (37) is arranged parallel to the longitudinal axis (45) of the layer module (30).

The electrical lines (37) are, for example, power, data and signal lines. At least some of such electrical lines (37) are connected to the camera system (151). These are, for example, two power lines, at least one data line and at least one signal line. For example, they feed a control and evaluation module (142) of the camera system (151). This control and evaluation module (142) comprises, for example, a data processing and storage unit (145). The data processing and storage unit (145) has, for example, a computing unit (143) and a data storage unit (144). The control and evaluation module (142) is used, on the one hand, to control the functions of the camera (156) and the lighting (154) and, on the other hand, to evaluate the information captured by the camera (156). In the computing unit (143), such information can be evaluated stochastically, for example, and then stored in the data storage unit (144).

A transmit and receive module can also be provided in the layer module (30). This allows, for example, the stochastic data to be queried directly from the layer module (30). Control commands for the camera (156) can also be entered, for example.

The layer module (30) can also have an energy storage device. This can, for example, buffer the power supply to the storage unit (144). For example, after disassembly of the layer module (30), the data stored in the data storage unit (144) can still be read out.

FIGS. 9-13 show a layer module (30) in the form of a force measuring module (32). For example, the inlet side (52) and the outlet side (81) of such layer module (30) are designed as described in connection with the first exemplary embodiment. A lid (64) closes the interior space (42) of the layer module (30). The force measuring module (32) also has electrical lines (37) and pneumatic channels (36) running through it from the inlet side (52) to the outlet side (81). These are designed as described in connection with the camera module (31). The design of the guide elements (121, 131), the guide element receptacles (55, 56) and the locking parts (91, 111) also corresponds to the design described in connection with the first exemplary embodiment.

Figure 11:
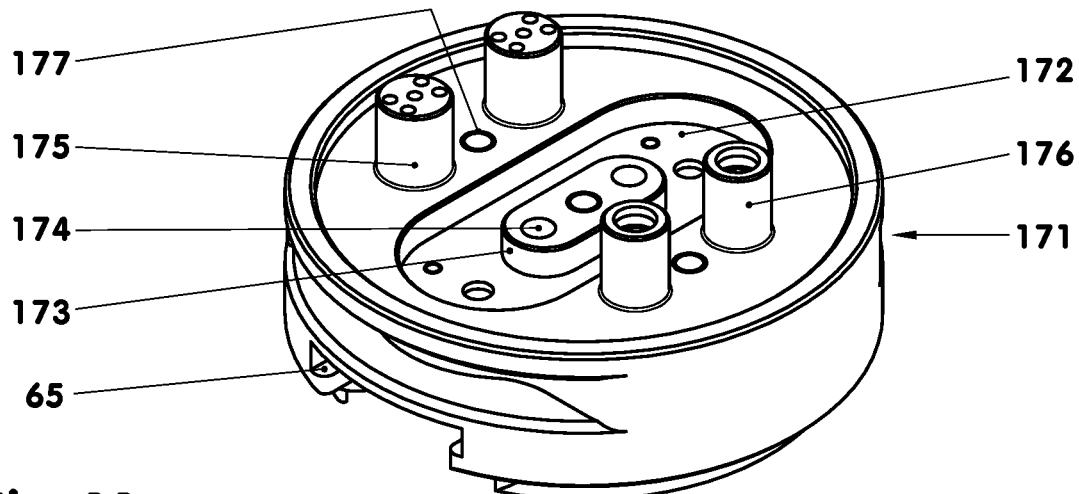
FIG. 11: Lower part of the housing body.
Figure 12:
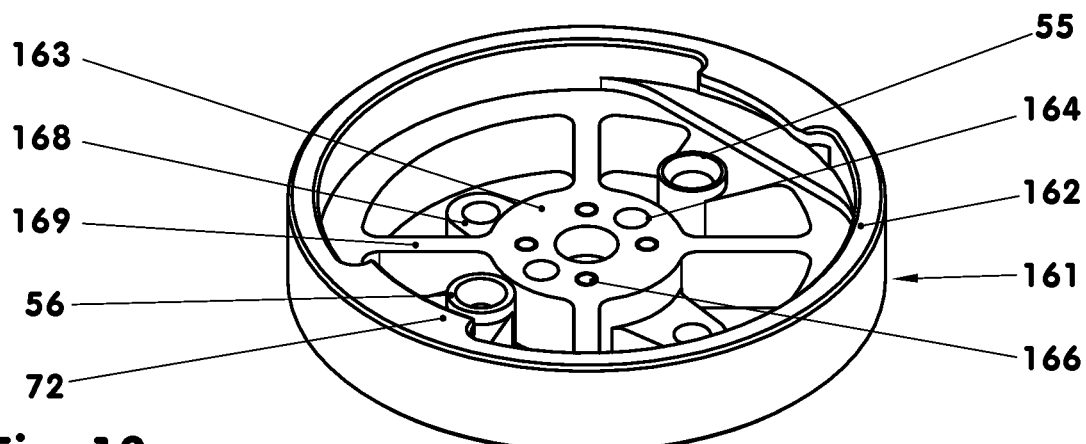
FIG. 12: Upper part of the housing body.
Figure 13:
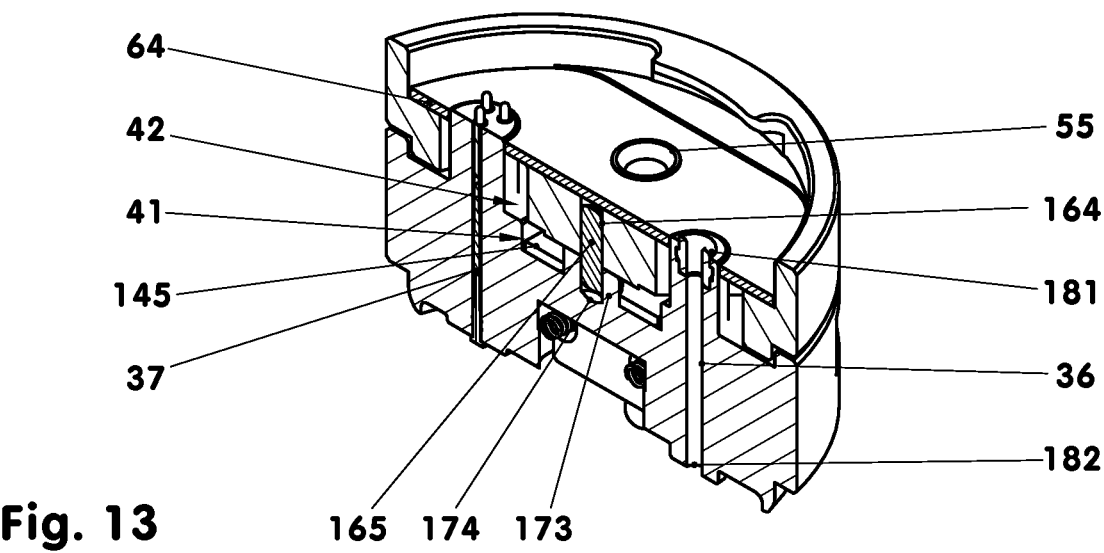
FIG. 13: Isometric sectional view of the layer module according to FIG. 9.

The housing (51) comprises a housing part (161) on the inlet side and a housing part (171) on the outlet side. The housing part (171) on the outlet side, see FIG. 11, is made, for example, from the material of the base body (61) of the first exemplary embodiment. In the exemplary embodiment, the housing part (161) on the inlet side, see FIG. 12, is made of the material of the insert pieces (71) of the camera module (31). In the assembled state, the housing part (161) on the inlet side and the housing part (171) on the outlet side are screwed together in the central region.

The housing part (171) on the outlet side has guide grooves (65) on both sides for the locking elements (91, 111). These are designed as described in connection with the first exemplary embodiment. On its side turned away from the guide grooves (65), the housing part (171) on the outlet side has a circuit board support (172). Two centering pin receptacles (174) are molded into a central connecting bar (173) penetrating the circuit board support (172). In the assembled state of the force measuring module (32), a data processing and storage unit (145) is arranged here, see FIG. 13.

The data processing and storage unit (145) comprises, for example, a computing unit (143), the data storage device (144) and an energy storage device. These are constructed, for example, as described in connection with the first exemplary embodiment.

Four guide tubes (175, 176) project from the side of the housing part (171) turned away from the guide grooves (65). Two of such guide tubes (176) surround the pneumatic channels (36). The two other guide tubes (175) form empty tubes for the electrical lines (37). An internal thread (177) is inserted into the housing part (171) on the outlet side between each two similar guide tubes (175, 175; 176, 176).

The housing part (161) on the inlet side, see FIG. 12, is designed as a spoked wheel. It has an outer ring (162), in which the circumferential edges (72) are interposed. The guide element receptacles (55, 56) are also rigidly connected to the outer ring (162). The geometric design of the guide element receptacles (55, 56) and their arrangement relative to the circumferential edges (72) corresponds to the design and arrangement of such parts in the camera module (31).

The hub (163) of the housing part (161) on the inlet side has two centering pin receptacles (164) that align with the centering pin receptacles (174) of the central connecting bar (173) when the force measuring module (32) is mounted. With the force measuring module (32) mounted, two centering pins (165), for example, center the housing part (171) on the outlet side and the housing part (161) on the inlet side relative to one another. Furthermore, threaded bores (166) are arranged in the hub (163) for receiving lid screw plugs (167). Two opposing eyelets (168) are also formed on the hub (163). When the force measuring module is mounted, the housing part (161) on the inlet side and the housing part (171) on the outlet side are fastened to one another by means of screws. Such screws penetrate the eyelets (168) and are fixed in the internal threads (177).

In the exemplary embodiment, the outer ring (162) and the hub (163) are connected to one another by means of four radially oriented spokes (169). The individual spoke (169) has, for example, a rectangular cross-section, wherein the extension in the longitudinal direction (35) is greater than in a direction tangential to the circumferential direction. Strain gauges are attached to the spokes (169) and, for example, to the hub (163). For example, two strain gauges are fastened to each spoke (169).

When the force measuring module (32) is mounted, the outer ring (162) can be rotated and/or displaced relative to the hub (163) and to the housing part (171) on the outlet side, deforming the spokes (169). The deformation of the spokes (169) determined by means of the strain gauges is a measure of forces and of torques with which the housing part (171) on the outlet side is loaded relative to the housing part (161) on the inlet side. From the changes in the electrical resistances of the strain gauges, the computing unit (143) can determine the direction of deformation and the degree of deformation. The result is stored in the data storage device (144), for example, as a single value and/or as an averaged value. If necessary, the value determined in this manner can be provided with a time stamp. The computing unit (143) and/or the data storage device (144) may have a transmit and receive module. This is constructed, for example, as described in connection with the first exemplary embodiment.

For electrical supply, data transmission and signal transmission, the data processing and storage unit (145) is connected to the electrical lines (37). The force measuring module (32) can also be pressurized with sealing air.

Figure 14:
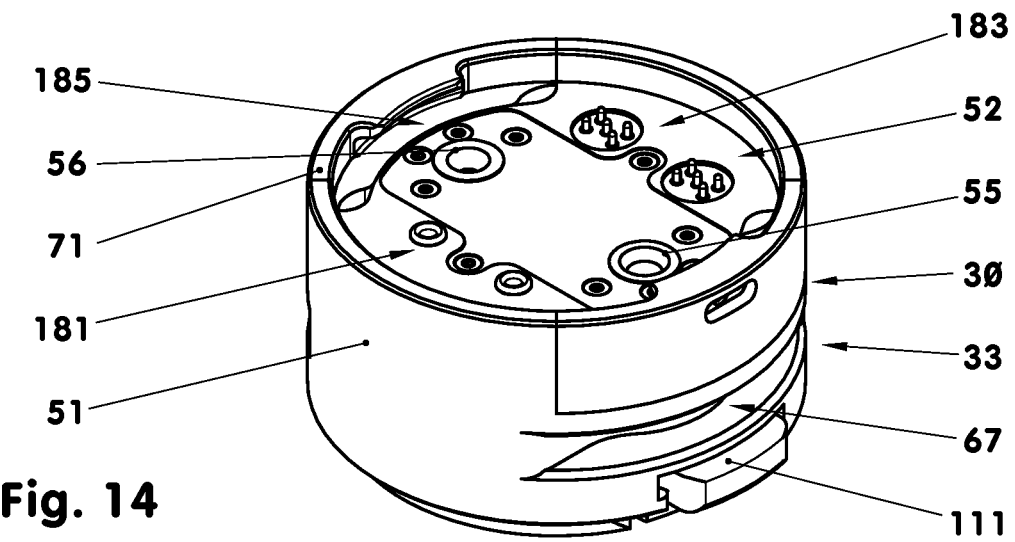
FIG. 14: Layer module as a computing module.
Figure 15:
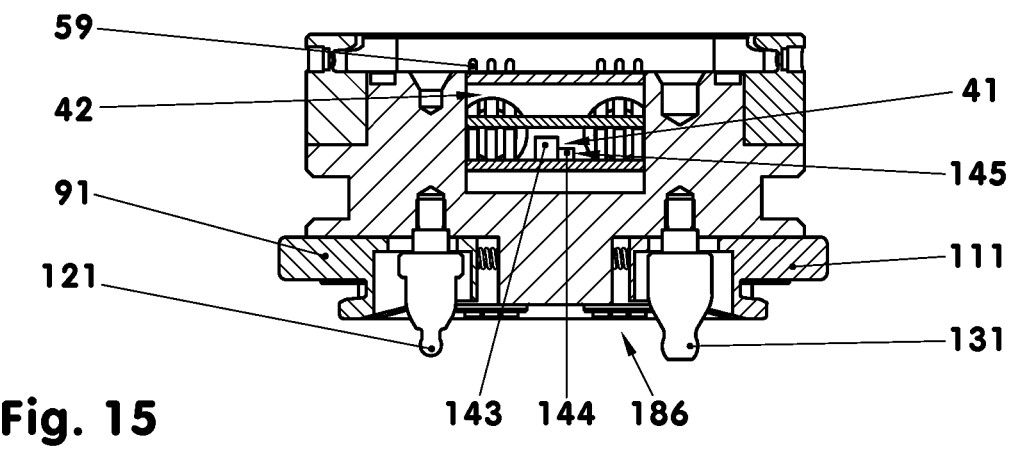
FIG. 15: Section through the layer module from FIG. 14.

FIGS. 14 and 15 show a layer module (30) in the form of a computing module (33). In this layer module (30), the outlet side (81) is also complementary to the inlet side (52). In this exemplary embodiment, this applies to the mechanical adapter geometries (185, 186), as well as to the pneumatic connections (181, 182) and the electrical interface banks (183, 184). However, it is also conceivable to design only the mechanical connecting elements (56, 121; 55, 131; 72, 91; 72, 111) to be complementary to one another. Both the outlet-side mechanical adapter geometry (186) and the inlet-side mechanical adapter geometry (185) are, for example, designed identically to the respective adapter geometries (185, 186) described in connection with the preceding exemplary embodiments.

A data processing and storage unit (145) is arranged in the interior space (42) of the computing module (33) as a functional assembly (41). The data processing and storage unit (145) is connected to the electrical lines (37) in terms of power, signals and data. For example, the data processing and storage unit (145) comprises the same components as the data processing and storage unit (145) of the force measuring module (32). By means of such data processing and storage unit (145), for example, data acquired by means of sensors of the grippers can be evaluated and condensed. For example, control commands for the robot can be calculated from the actual data of the sensors. From the condensed data, information about the wear of the gripping device or its components can be obtained. The interior space (42) of the computing module (33) can also be pressurized by sealing air. The compressed air required for this purpose is taken, for example, from the pneumatic channels (36), for example via a directional control valve and/or a throttle.

Figure 16:
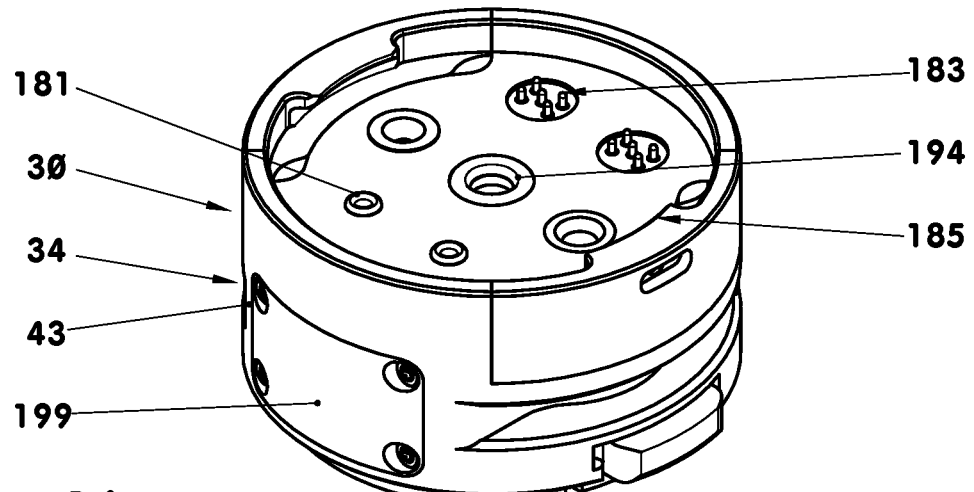
FIG. 16: Layer module as a nozzle module.
Figure 17:
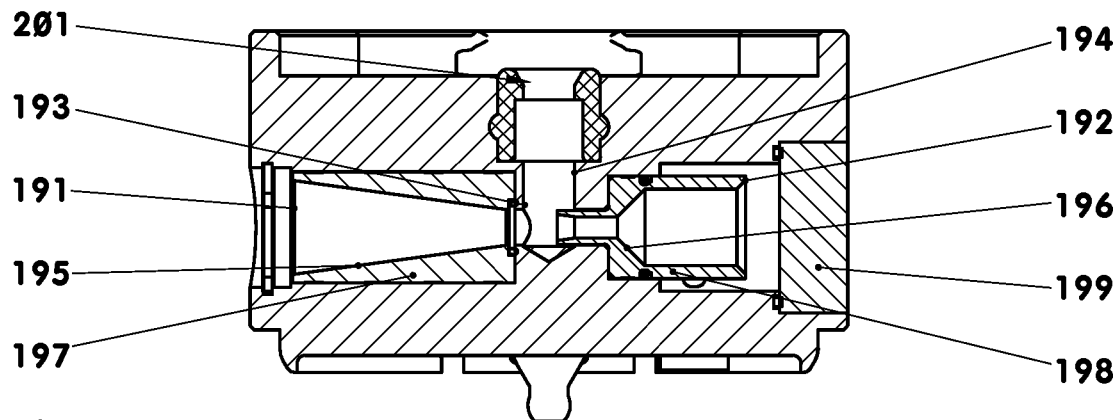
FIG. 17: Section through the layer module of FIG. 16.

FIGS. 16 and 17 show a layer module (30) in the form of a nozzle module (34). In such layer module (30), the inlet side (52) and the outlet side (81) are also designed to complement one another. For example, the pneumatic interfaces (181, 182) on the layer module side, the electrical interface banks (183, 184) and the mechanical adapter geometries (185, 186) are as described in connection with the preceding exemplary embodiments. However, it is also conceivable to design only the mechanical adapter geometries (185, 186) in a complementary manner.

In this exemplary embodiment, the nozzle module (34) has two alternative nozzle inlets (191, 192) and one nozzle outlet (193). The respective nozzle inlets (191, 192) are arranged on the shell surface (43) of the nozzle module (34). In each case, a nozzle (195; 196) is arranged between each of the nozzle inlets (191; 192) and a longitudinal channel (194). The respective nozzle (195; 196) tapers towards the longitudinal channel (194). Both nozzles (195; 196) have replaceable nozzle inserts (197; 198). These can be designed as Venturi nozzles, for example. In the illustration in FIG. 17, the nozzle inlet (191) shown on the right is closed by means of a closure plate (199). When pressurizing a pneumatic line connected to the other nozzle inlet (192), the flow velocity in the longitudinal channel (194) is higher than at the nozzle inlet (192). This nozzle module (34) can be used, for example, to drive a pneumatically actuated gripping unit. The pneumatic functional assembly (41) of a layer module (30) can generate, convert or transmit a negative pressure, such as a vacuum, or a positive pressure.

In the illustration of FIGS. 16 and 17, the longitudinal channel (194) opens at the inlet side (52). However, it is also conceivable to arrange the orifice (201) of the longitudinal channel (194) on the outlet side (81) of the nozzle module (34).

Figure 18:
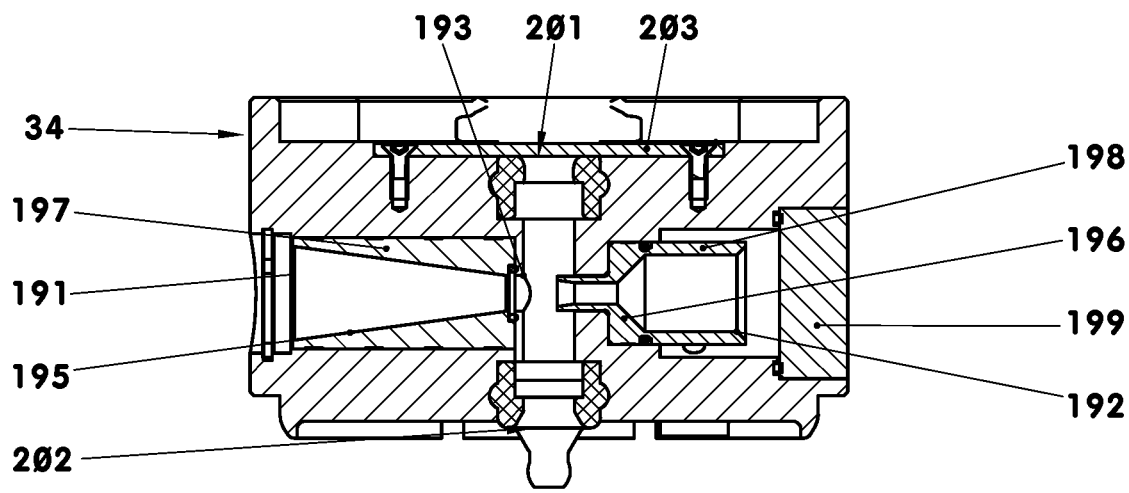
FIG. 18: Variant of the nozzle module.

FIG. 18 shows a variant of the nozzle module (34). Here, the functional assembly (41) has a longitudinal channel (194) with an orifice (201) at the inlet side (52) and an orifice (202) at the outlet side (81). In the illustration of FIG. 18, the orifice (201) on the inlet side is closed by means of a cover plate (203). Alternatively, the orifice (202) on the outlet side can also be closed. If necessary, both in the embodiment of FIGS. 16 and 17 and in the embodiment of FIG. 18, a, for example electromagnetically actuated, directional control valve can be provided for switching the gas flow. A measuring device for measuring the pressure and/or the volume flow of the pneumatic medium can also be arranged in the layer module (30).

A layer module (30) according to FIGS. 16-18 can additionally or alternatively include a pressure intensifier, an accumulator, a compressor, etc. The electrical control is then performed by means of the electrical lines (37). If necessary, a storage and evaluation unit (142) can be provided, for example in connection with a measuring device, as described above.

Figure 19:
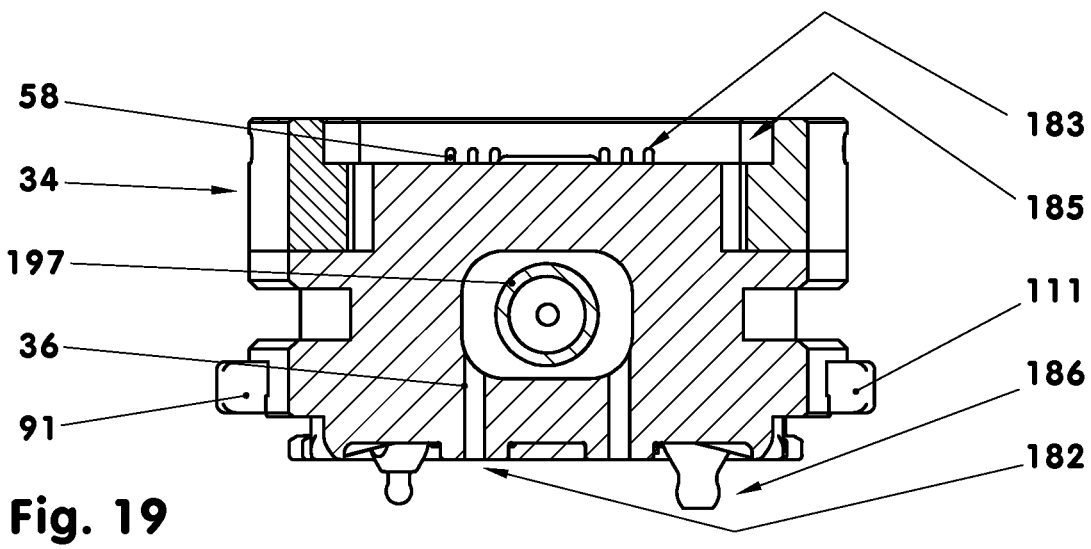
FIG. 19: Nozzle module with central supply.

FIG. 19 shows a sectional view of a nozzle module (34), in which the pneumatic channels (36) are connected to the nozzle outlet (193). Thereby, the pneumatic channels (36) open at a pneumatic outlet interface (182). In this exemplary embodiment, the longitudinal channel (194) is designed as shown in connection with the preceding exemplary embodiments.

Figure 20:
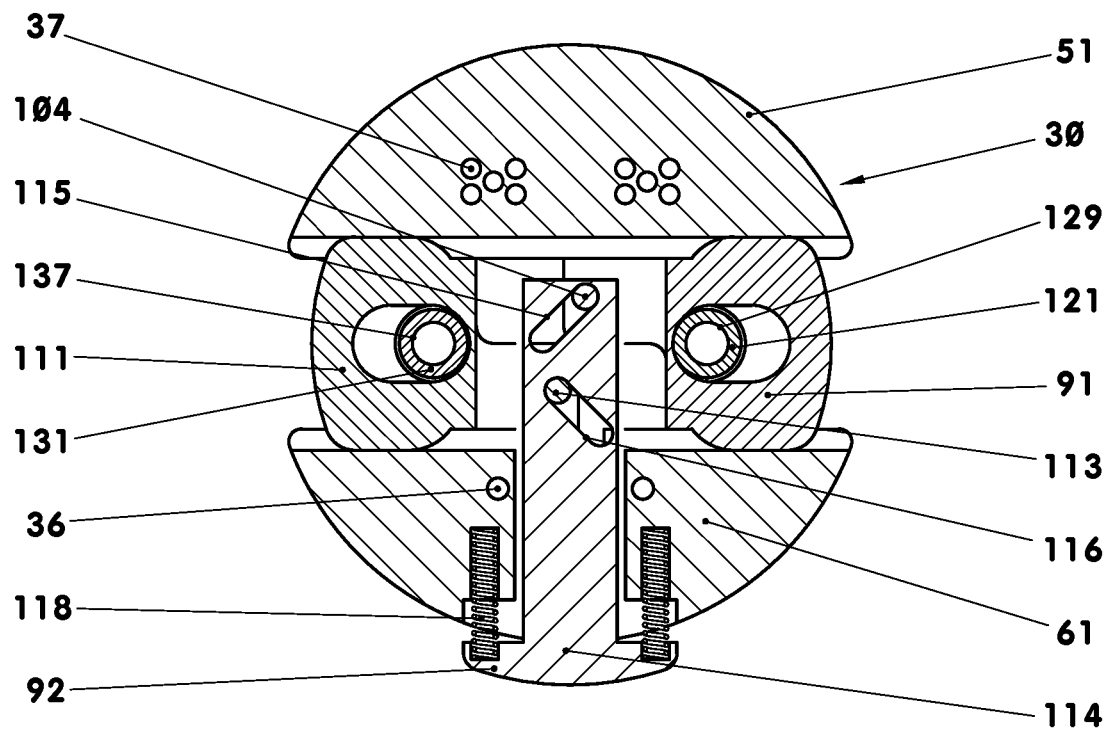
FIG. 20: Section of a layer module with a handle element.

FIG. 20 shows a sectional view of a layer module (30) with a single gripping region (92). For example, the design of the guide elements (121, 131) and the interface geometry of the locking elements (91, 111) is identical to the guide elements (121, 131) and to the interface geometries of the layer modules (30) shown in FIGS. 1-18. Thus, the layer module (30) of FIG. 20 is compatible with the other layer modules (30) and can be combined with them. The pneumatic channels (36) and the electrical lines (37) of the other layer modules (30) can also be connected directly. For example, the outer dimensions of the housing (51) match the corresponding dimensions of the other exemplary embodiments.

In this layer module (30), the two locking parts (91, 111) can be actuated together by means of a single pushbutton (114) comprising the gripping region (92). The two locking parts (91, 111) are each displaceably mounted in the housing (51) and guided by means of the guide elements (121, 131) fastened in the housing (51). The guide elements (121, 131) are hollow, for example, with an internal channel (129, 137). The respective guide slot (93) and the hooks (96) are designed as described in connection with the first exemplary embodiment. Each of the locking parts (91; 111) has a drive pin (104; 113), each of which engages a drive slot (115; 116) of the pushbutton (114).

The gripping region (92) protrudes in a radially outward manner from the layer module (30). In the exemplary embodiment, it is loaded into the extended position by means of two spring elements (118). In the illustration of FIG. 20, the two spring elements (118), which are designed, for example, as compression springs (118), are arranged between the base body (61) and the gripping region (92). Another arrangement of the spring elements (118) is also conceivable. In the exemplary embodiment, the two drive slots (115, 116) are arranged in a V-shape relative to one another. The angle enclosed by the two drive slots (115, 116) amounts to 90 degrees, for example. Each of the drive pins (104, 113) is located at the end of the drive slot (115, 116) turned towards the hook (96). The hooks (96) located above the section plane are not shown here.

In the locking position (103) shown, the spring elements (118) press both locking parts (91, 111), for example, in a radially outward manner, via the positive guidance (104, 115; 113, 116) of the drive slots (115, 116) and the drive pins (104, 113). The compression springs (118) are partially loaded and partially compressed compared with their relaxed state. If the pushbutton (114) is pushed in by means of an external compressive force, the load on the compression springs (118) is increased. The pushbutton (114) displaces both locking parts (91, 111) towards the center via the positive guides (104, 115; 113, 116). For example, the hooks (96) of the locking mechanism are released. After the removal of the manually or automatically applied external force, the locking parts (91, 111) are moved back into the locking position (103) under spring load.

The individual spring-loaded locking part (91; 111) can also engage behind another layer module (30) or a fixed part (230) in a pivoting motion, for example, about the longitudinal axis (45). Thereby, at least two locking parts (91, 111) have the same pivot direction. The locking parts (91; 111) may, for example, be rigidly connected to one another and jointly loaded by means of a spring element (112) for locking. In this exemplary embodiment as well, each locking part (91; 111) engages around a respective guide element (121; 131). During pivoting, the actuating element (91; 111) is guided along such guide element (121; 131). To release the locking mechanism, a compressive force is applied to either one or more pushbuttons. The transmission of the forces to the individual locking parts (91; 111) takes place as described above, for example.

The actuation can also be carried out by means of a disk segment with an outwardly projecting lug that can be pivoted about the longitudinal axis (45), for example. This can be part of or operate a spring-loaded locking part (91, 111). It is also conceivable to actuate both locking parts (91, 111) by means of an individual disk segment.

In all variants, the interposition of an electric drive and/or a gear is also conceivable.

Figure 21:
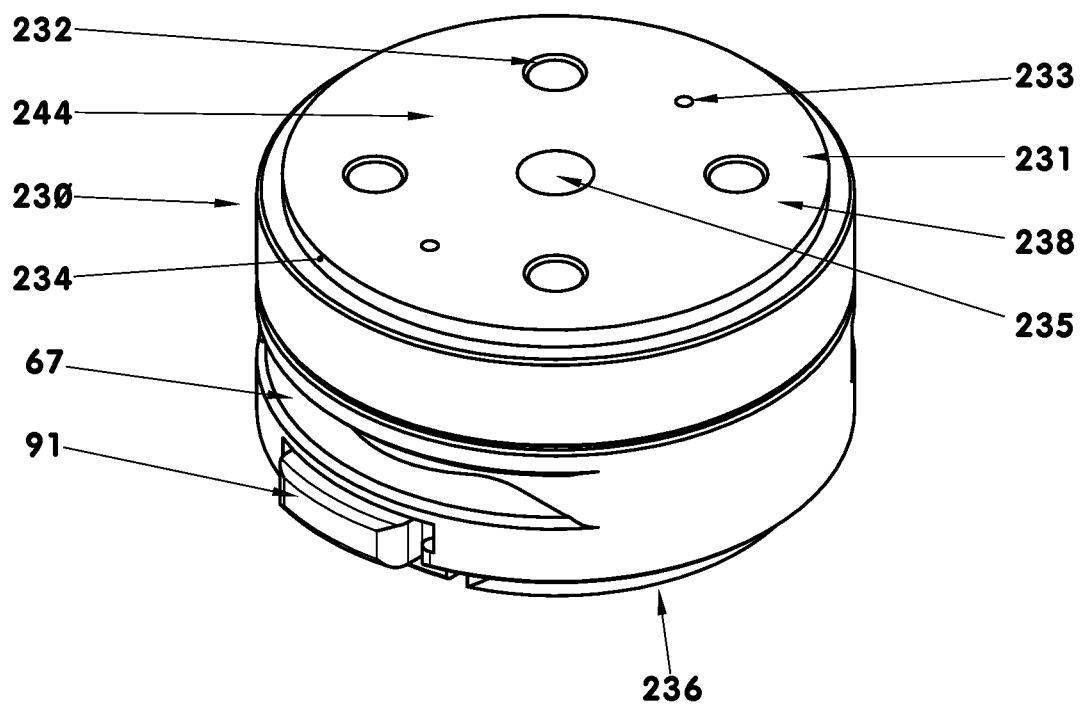
FIG. 21: Fixed part.

A fixed part (230) is shown in FIG. 21. Such fixed part (230) can be fastened either directly to the arm of the robot or by means of an adapter to the robot arm. In the exemplary embodiment, it has a fixed part inlet (244) with a fastening flange (231) with fastening bores (232) and centering devices (233). A radial centering device (234) also secures the position of the fixed part (230) relative to the robot arm. For example, a media feed (235) is provided centrally in the fixed part (230). Electrical and pneumatic lines, for example, are fed through these from the robot arm into the interior space of the fixed part (230). For example, the fixed part outlet (236) is complementary to the inlet sides (52) of the layer modules (30). A computing unit, an evaluation unit and/or a storage unit can also be arranged in the fixed part (230).

Figure 22:
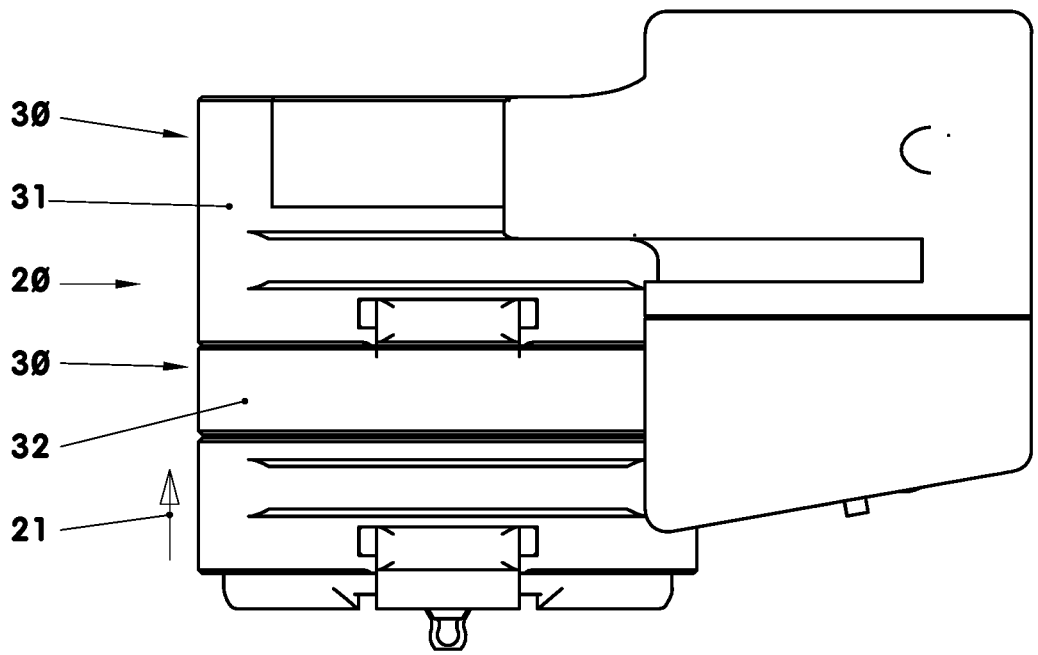
FIG. 22: System of two layer modules.

FIG. 22 shows an adapter system (20) consisting of two layer modules (30). The individual layer modules (30) may be joined together in any order. In the exemplary embodiment shown, a layer module (30) is a camera module (31). A force measuring module (32) is releasably fastened to the outlet side (81) of the camera module (31).

The joining of the layer modules (30) shown can be performed manually or by means of a gripping device. For example, the camera module (31) is already mounted on the robot arm or it is seated in a layer module receptacle that engages, for example, the gripping or guide recesses (67). Thus, the force measuring module (32) is positioned in front of the camera module (31), such that the inlet side (52) of the force measuring module (32) points to the outlet side (81) of the camera module (31). The longitudinal axes (45) of the two layer modules (30) are aligned with one another. Both locking parts (91, 111) of the camera module (31) are pressed in. As the force measuring module (32) continues to approach the camera module (31) in the mounting direction (21) oriented in the longitudinal direction (35), the guide elements (121, 131) of the camera module (31) immerse into the guide element receptacles (55, 56) of the force measuring module (32). Due to the different geometric design of the two guide pins (121, 131) and the associated guide pin receptacles (56, 55), the force measuring module (32) can only be pushed onto the camera module (31) in one position. Other structural solutions for ensuring the radial orientation of the layer modules (30) relative to one another are also conceivable. Once the guide pins (121, 131) are immersed in the guide pin receptacles (55, 56) and the two layer modules (31, 32) about one another, no further displacement of the force measuring module (32) relative to the camera module (31) in the mounting direction (21) is possible. The guide pins (121, 131) inserted in the guide pin receptacles (55, 56) center the layer module (30) relative to the fixed part (230) in a positive-locking manner.

As soon as the inlet side (52) of the force measuring module (32) abuts the outlet side (81) of the camera module (31), the locking parts (91, 111) are released or relieved. The locking parts (91, 111) are displaced outward by means of the spring elements (112; 118). Thereby, the respective hook (96) moves to the circumferential edge (72). The hook (96) slides with its hook lower side (98) along the lower side (74) of the circumferential edge (72). The two wedges pull the force measuring module (32) and the camera module (31) further together in the mounting direction (21). The hooks (96) engage behind the circumferential edge (72). The two layer modules (30) are secured relative to one another in a force-locking and/or positive-locking manner.

With the joining of the adapter system (20), the two layer modules (30, 30) are also joined together pneumatically, for example. The elastically deformable seal inserts (57), for example, which are compressed during joining, serve this purpose. The parting line is thus sealed. It is also conceivable to route the pneumatic connection through the guide pins (121; 131). Moreover, when the adapter system (20) is joined, for example, the electrical lines (37) of the layer modules (30, 30) are connected together. During joining, the spring-loaded contacts (59) of the inlet side (52) are pressed in by means of the contact plates (83) of the outlet side (81). Thus, the electrical connection between the layer modules (30, 30) is secured after joining under spring load. A hydraulic connection between the layer modules (30, 30) is also conceivable. This can then be used to transmit, for example, load current, signals, data, pneumatic medium, hydraulic medium, etc. Further layer modules (30) are joined as described above.

The separation of the layer modules (30, 30) can also be performed manually or automatically. In both cases, for example, one of the layer modules (30) can be held in the gripping or guide recesses (67). This is done, for example, in a receptacle device or by means of a gripper. If necessary, the receptacle device can be designed as an unlocking device. Such unlocking device actuates the locking elements (91, 111), for example. By means of the pushbutton (114) or by means of the gripping regions (92), both locking elements (91, 111) are moved inwards against the forces of the spring elements (112; 118). The locking parts (91, 111) release from the circumferential edges (72). The layer module (30) to be removed can now be removed from the other layer module (30) against the mounting direction (21). For example, the removed layer module (30) is stored in a magazine. Subsequently, for example, another layer module (30) can be placed on top of the first layer module (30).

Figure 23:
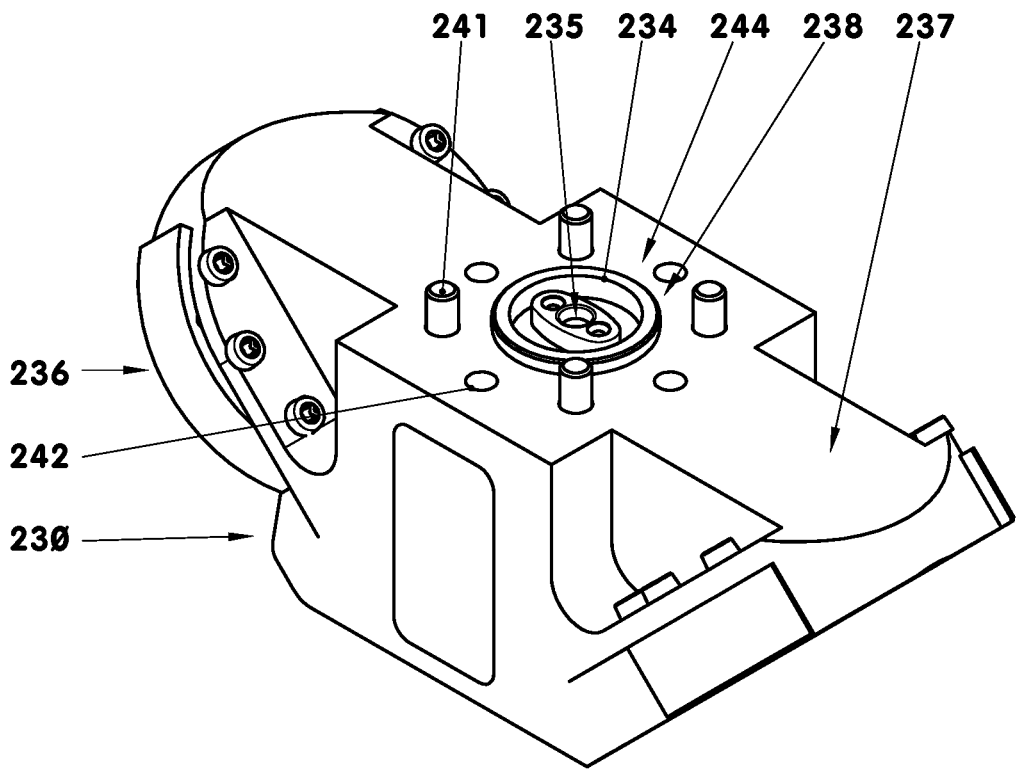
FIG. 23: Fixed part as Y-fixed part.

FIG. 23 shows a fixed part (230) having a fixed part inlet (244) and two fixed part outlets (236). In this exemplary embodiment, the design has a Y-fixed part (237). The interface (238) on the robot side of such fixed part (230) has, for example, a radial centering device (234) in the form of a centering ring, a plurality of centering pins (241), fastening apertures (242) and a media feedthrough (235). By means of such interface (238) on the robot side, the Y-fixed part (237) can be fastened directly to a robot arm or, via an adapter, to a robot arm. The fixed part (230) can also have the shape of a T, for example. It is also conceivable to form the fixed part (230) with more than two fixed part outlets (236).

The Y-fixed part (237) shown has two fixed part outlets (236), whose center lines enclose a right angle with one another in the exemplary embodiment. Both fixed part outlets (236) are identical to one another. For example, the inlet sides (52) of the layer modules (30) are designed to be complementary.

In the Y-fixed part (237), the electrical and pneumatic lines coming from the robot are rearranged and/or regrouped, such that they correspond to the pneumatic channels (36) and the electrical lines (37) of the layer modules (30) at the fixed part outlets (236). An electrical adjustment of, for example, signal levels or signal modulation is also conceivable. Furthermore, a computing unit, an evaluation unit and/or a storage unit can be provided in the Y-fixed part (237).

Figure 24:
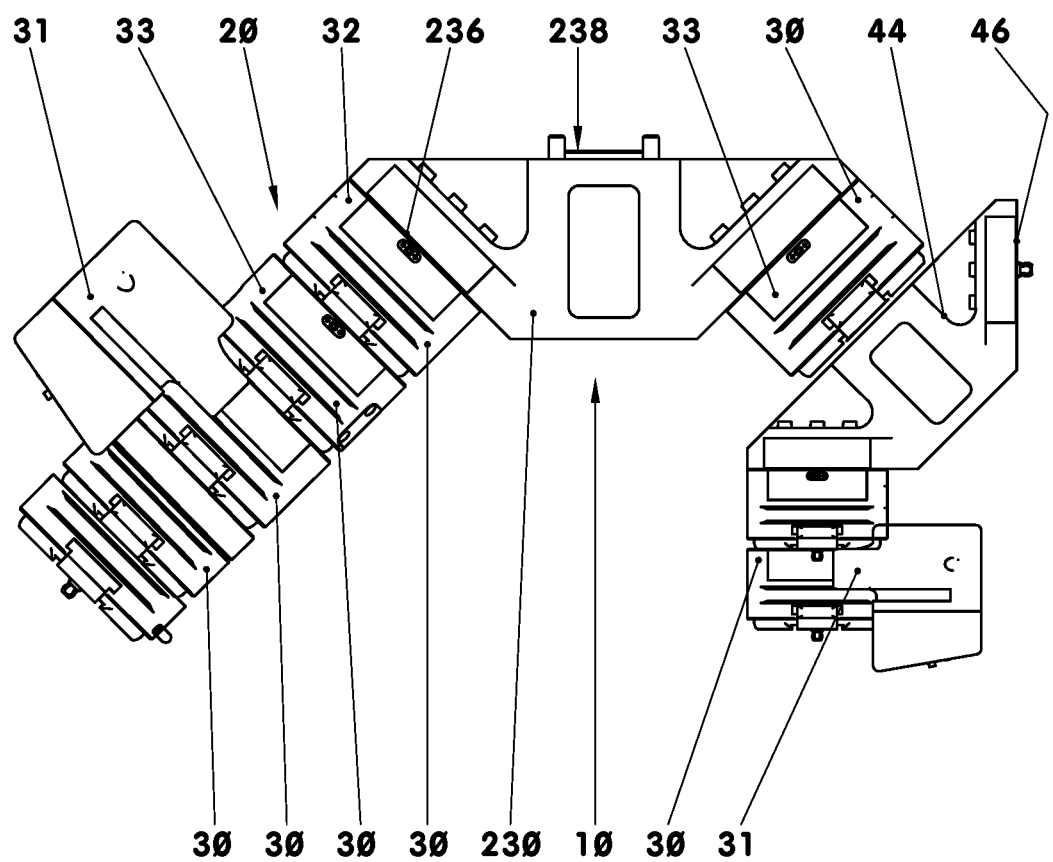
FIG. 24: Layer module system with a fixed part.

FIG. 24 illustrates a layer module system (10) with a fixed part (230) and a plurality of layer modules (30). In this exemplary embodiment, the fixed part (230) has the shape of a Y-fixed part (237) according to FIG. 23. A plurality of layer modules (30) with different electrical, electromechanical or pneumatic functional assemblies (41) is connected to both fixed part outlets (236). Thus, the layered module system (10) comprises at least one adapter system (20). The fixed part (230) can also have more than two fixed part outlets (236).

At the fixed part outlet (236) on the left in FIG. 24, for example, a camera module (31), a force measuring module (32), a computing module (33) and a nozzle module (34) etc. are arranged in series one behind the other.

For example, a distribution module (44) is connected downstream of a computing module (33) at the right fixed part outlet (236). For example, a computing unit and a storage unit are integrated in this distribution module (44). In such exemplary embodiment, the two distribution outlets (46) of the distribution module (44) are made smaller than the outlet side (81) of the upstream computing module (33). The layer modules (30) downstream of the distribution module (44) are also geometrically smaller than the other layer modules (30) of such layer module system (10). The structure of the individual layer modules (30) and their assembly is analogous to the structure and assembly of the embodiments described in connection with the other exemplary embodiments. The fixed part (230) of the layer module system (10) can also be designed according to the exemplary embodiment described in connection with FIG. 21.

Combinations of the individual embodiments are also conceivable.

LIST OF REFERENCE SIGNS

10 Layer module system
20 Adapter system
21 Mounting direction
30 Layer module
31 Camera module
32 Force measuring module
33 Computing module
34 Nozzle module
35 Longitudinal direction
36 Pneumatic channels
37 Electrical lines
38 Groups of electrical contacts
39 Groups of contact plates
41 Functional assembly
42 Interior space of (30)
43 Shell surface of (30)
44 Distribution module
45 Longitudinal axis of (30)
46 Distribution outlets of (44)
51 Housing
52 Inlet side
53 Cover region
54 Edge
55 Guide element receptacle, part of a mechanical connecting element
56 Guide element receptacle, part of a mechanical connecting element
57 Seal insert
58 Inlet contacts
59 Contact pin, spring-loaded
61 Base body
62 Upper side
63 Planar surface of (54)
64 Lid
65 Guide grooves
66 Threaded bore
67 Gripping or guide recess
68 Base surface of (67)
69 Guide surfaces
71 Insert pieces
72 Circumferential edge, part of a mechanical connecting element
73 Upper side of (72)
74 Lower side of (72)
81 Outlet side
82 Base plate
83 Contact plates
84 Pneumatic connections
85 Support collar of (84)
86 Channel inlet
87 Channel outlet
91 Locking part, first locking part, part of a mechanical connecting element
92 Gripping region
93 Guide slot
94 Guide strips
96 Hooks, rear gripping hooks
97 Hook upper side 98 Hook lower side
99 Insertion chamfer
101 Spring receptacles
103 Locking position
104 Drive pin
106 Support surface
111 Locking part, second locking part, part of a mechanical connecting element
112 Spring elements, compression springs
113 Drive pin
114 Pushbutton
115 Drive slot
116 Drive slot
118 Spring elements, compression springs
121 Guide element, first guide element, guide pin, part of a mechanical connecting element
122 External thread
123 Guide collar
124 Support collar
125 Mounting section
127 Key surfaces
128 Guide element head
129 Channel
131 Guide element, second guide element, guide pin, part of a mechanical connecting element
132 External thread
133 Guide collar
134 Support collar
135 Guide pin head
136 Internal hexagon
137 Channel
141 Circuit board
142 Control and evaluation module
143 Computing unit
144 Storage unit, data storage unit
145 Data processing and storage unit
151 Camera system
152 Camera housing
153 Optical unit
154 Illumination unit
155 Lens
156 Camera
161 Housing part on the inlet side
162 Outer ring
163 Hub
164 Centering pin receptacles
165 Centering pin
166 Threaded bores
167 Lid screw plugs
168 Eyelets
169 Spokes
171 Housing part on the outlet side
172 Circuit board support
173 Central connecting bar
174 Centering pin receptacles
175 Guide tubes
176 Guide tubes
177 Internal thread
181 Part of a pneumatic inlet interface on the layer module side
182 Part of a pneumatic outlet interface on the layer module side
183 Electrical interface bank on the inlet side
184 Electrical interface bank on the outlet side
185 Inlet-side mechanical adapter geometry of (30)
186 Outlet-side mechanical adapter geometry of (30)
191 Nozzle inlet
192 Nozzle inlet
193 Nozzle outlet
194 Longitudinal channel
195 Nozzle
196 Nozzle
197 Nozzle insert
198 Nozzle insert
199 Closure plate
201 Orifice of (194) to (52)
202 Orifice of (194) to (81)
203 Cover plate
230 Fixed part
231 Fastening flange
232 Fastening bores
233 Centering devices
234 Radial centering device, centering ring
235 Media feed
236 Outlet side, fixed part outlets
237 Y-fixed part
238 Interface to the robot
241 Centering pin
242 Fastening apertures
244 Fixed part inlet

The invention claimed is:

1. A layer module (30) for use on a robot, comprising:
an inlet side (52) having an inlet-side mechanical adapter geometry (185), and
an outlet side (81) having an outlet-side mechanical adapter geometry (186), wherein the inlet-side mechanical adapter geometry (185) and the outlet-side mechanical adapter geometry (186) are designed to be complementary to one another;
an electrical, electromechanical, hydraulic and/or pneumatic functional assembly (41), wherein the functional assembly (41) can be contacted electrically, hydraulically and/or pneumatically on the inlet side (52) and/or on the outlet side (81);
at least two locking parts (111; 91) that are mounted in a spring-loaded, displaceable or pivotable manner; and
at least two guide elements (121, 131) that are oriented in a longitudinal direction (35) of the layer module (30) and have geometrically different designs,
wherein each of the locking parts (91; 111) engages around a respective guide element (121; 131), such that the layer module (30) can be coupled with a fixed part (230) having a fixed part outlet (236) complementary to the inlet side (52) or to the outlet side (81) and/or with at least one further layer module (30) in a force-locking and/or positive-locking manner.

2. The layer module (30) according to claim 1,
wherein all locking parts (91, 111) and all guide elements (121, 131) are arranged either at the inlet side (52) or at the outlet side (81) of the layer module (30).

3. The layer module (30) according to claim 1,
wherein a data processing and storage unit (145) is arranged in an interior space (42) of the layer module (30).

4. The layer module (30) according to claim 3,
wherein the data processing and storage unit (145) comprises a data storage device (144) and an energy storage device.

5. The layer module (30) according to claim 1,
wherein at least one hydraulic or pneumatic nozzle (195; 196) is arranged in an interior space (42) of the layer module (30).

6. The layer module (30) according to claim 1,
wherein complementary electrical contacts (58, 83) are arranged on the inlet side (52) and on the outlet side (81),
wherein either at least one electrical contact (58) of the inlet side (52) or at least one electrical contact (83) of the outlet side (81) is designed as a spring-loaded contact pin (59) in the longitudinal direction (35) of the layer module (30).

7. The layer module (30) according to claim 1,
wherein complementary pneumatic connections (181, 182) are arranged on the inlet side (52) and on the outlet side (81) and are connected by a pneumatic channel (36),
wherein the pneumatic connection (181) of the inlet side (52) or the pneumatic connection (182) of the outlet side (81) has a seal insert (57).

8. An adapter system (20), comprising at least two layer modules (30) according to claim 1,
wherein the outlet side (81) of a first of the at least two layer modules (30) is connected to the inlet side (52) of a second of the at least two layer modules (30) in a force-locking and/or positive-locking manner.

9. A layer module system (10) comprising
an adapter system (20) according to claim 8 and
a fixed part (230),
wherein the fixed part (230) is connected to a free inlet side (52) or to a free outlet side (81) of the adapter system (20) in a force-locking and/or positive-locking manner, and
wherein the fixed part outlet (236) is designed to be complementary to the inlet side (52) or outlet side (81) of the adapter system (20) coupled thereto.

10. The layer module system (10) according to claim 9,
wherein the fixed part (230) has a fixed part inlet (244) and at least two fixed part outlets (236).

\* \* \* \* \*